United States Patent [19]

Nason

[11] Patent Number: 4,473,059
[45] Date of Patent: Sep. 25, 1984

[54] WOOD BURNING STOVE

[76] Inventor: Martin L. Nason, P.O. Box 672, Rumfor, Me. 04276

[21] Appl. No.: 327,815

[22] Filed: Dec. 7, 1981

[51] Int. Cl.³ .............................................. F24C 1/00
[52] U.S. Cl. ........................................ 126/58; 126/67; 126/77
[58] Field of Search .................... 126/58, 60, 61, 64, 126/65, 66, 70, 67, 72, 76, 77, 80, 83

[56] References Cited

U.S. PATENT DOCUMENTS

| | | | |
|---|---|---|---|
| 80,935 | 8/1868 | Filley | 126/58 |
| 1,687,430 | 10/1928 | Diekmann | 126/67 |
| 1,792,487 | 2/1931 | Futral | 34/58 |
| 2,501,812 | 3/1950 | Fodor | 126/67 |

FOREIGN PATENT DOCUMENTS

| | | | |
|---|---|---|---|
| 1004245 | 3/1952 | France | 126/72 |
| 1021312 | 2/1953 | France | 126/77 |

Primary Examiner—James C. Yeung

[57] ABSTRACT

Wood burning stoves are of a type having a lower chamber and an upper chamber interconnected by a port. Air inlets are located laterally of the base of a fire in the lower chamber with a natural draft therein effecting a multitude of upwardly rising air streams of which one type is hot and oxygen poor and which carry and heat another type of air stream which is oxygen rich. The port is so dimensioned and spaced in relation to the lower chamber and to the flue outlet of the upper chamber that a secondary combustion zone is provided in which the upwardly rising streams are suddenly contracted, expanded and intermingled with simultaneous heat loss minimized ensuring the maintenance of a temperature adequate to result in the combustion of pyrolitic products.

18 Claims, 13 Drawing Figures

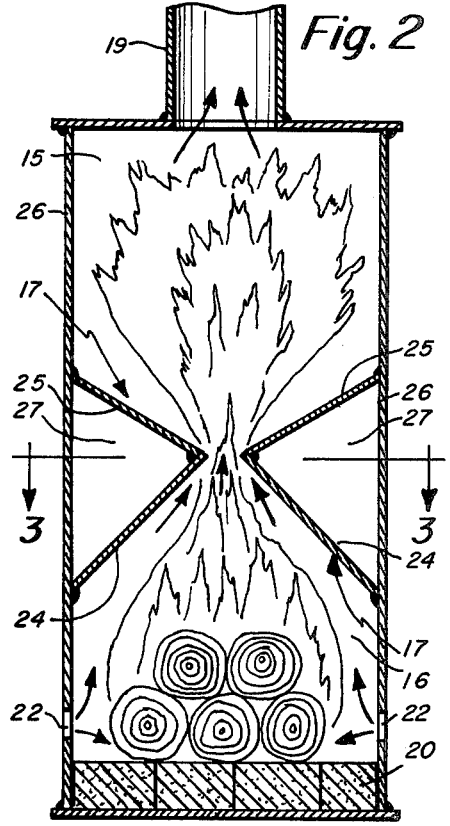
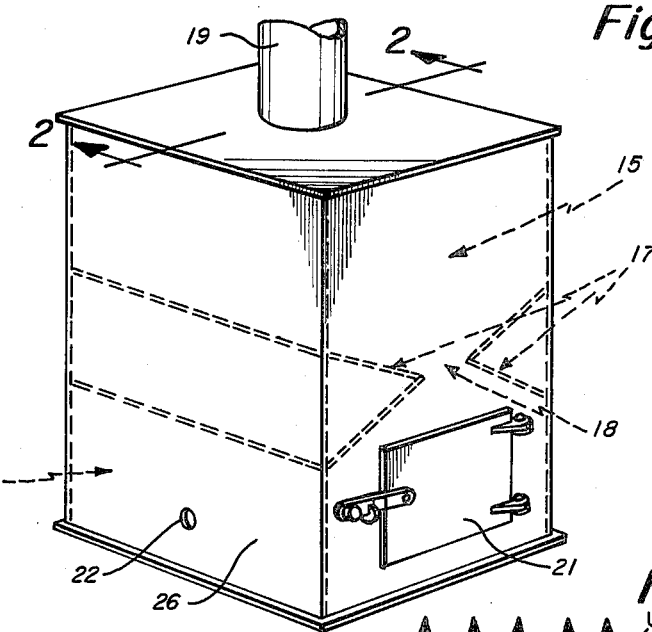
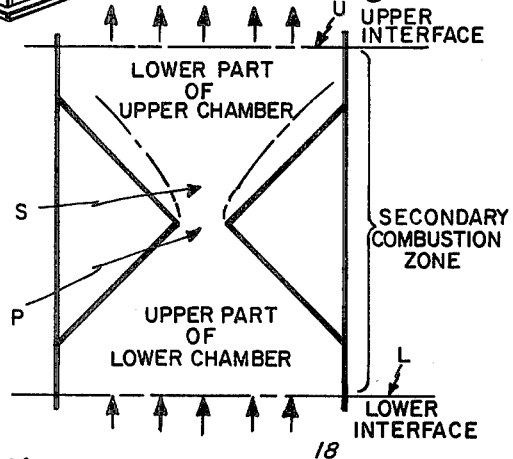
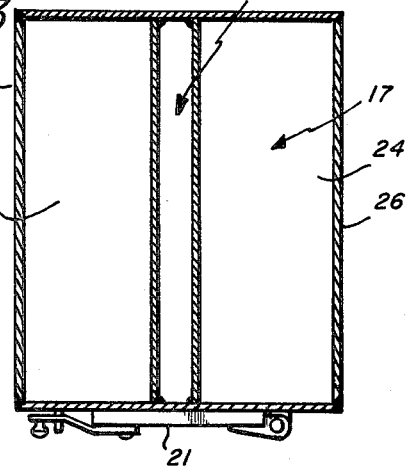

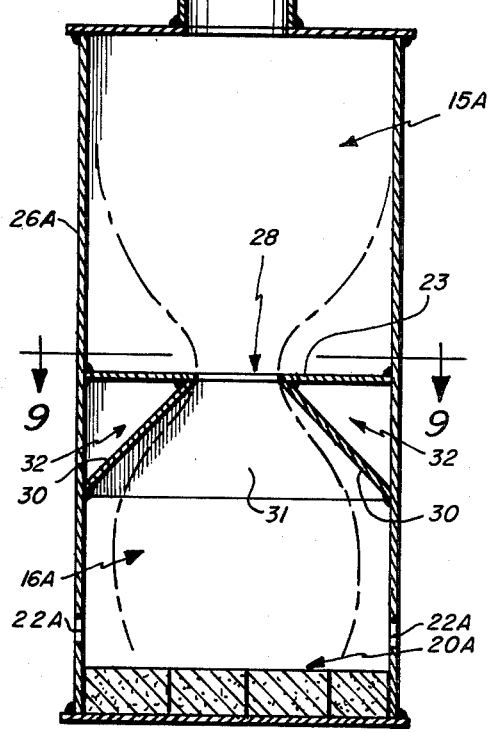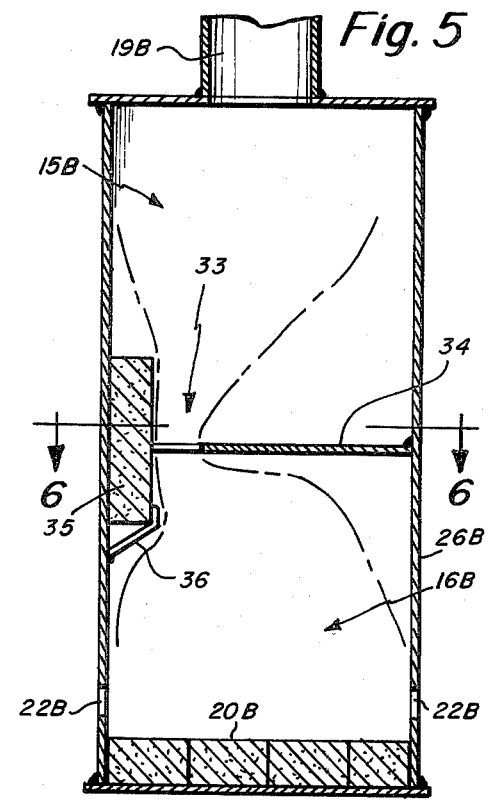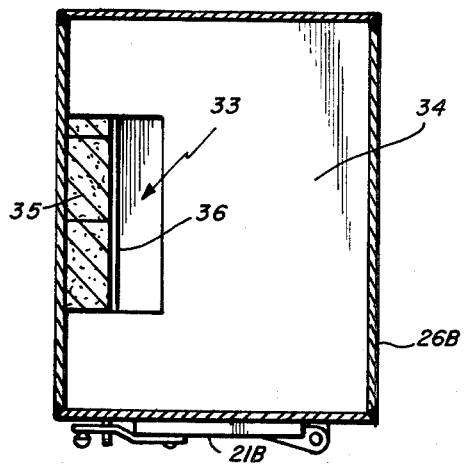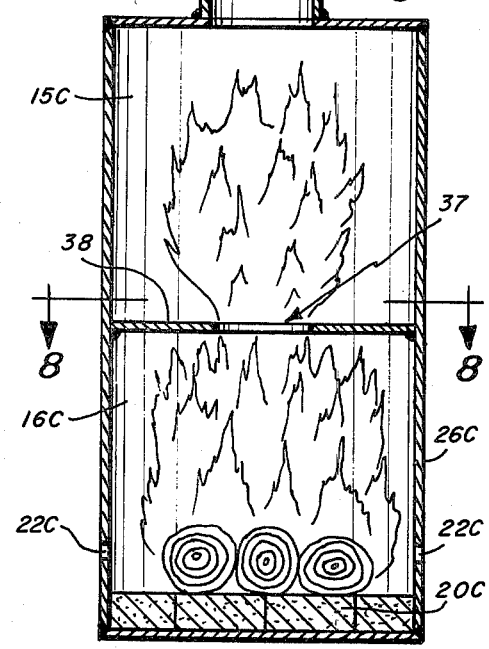

4,473,059

WOOD BURNING STOVE

BACKGROUND REFERENCE

U.S. Letters Pat. No. 1,792,487.

BACKGROUND OF THE INVENTION

Much has been written about wood burning stoves since the high cost of liquid fuels resulted in the widespread and increasing use of wood as an alternate fuel. In addition to such information about available stoves, there has been recently granted a number of patents for stoves that enable wood to be burned with improved efficiency over fireplaces and over stoves and heaters that were not air tight.

Air tight stoves of differing constructions are available and these do enable wood to be burned with increased efficiency although it is recognized that their use is attended by a relatively rapid build up of creosote in chimneys.

It is well established that such an unwanted consequence can be avoided if a stove temperature is attained at which pyrolysis gases ignite, 725° F. in the case of methanol and 1128° F. in the case of carbon monoxide. Stoves operable to achieve such temperatures must provide for the primary combustion of the wood and the secondary combustion of the pyrolysis gases and any unburned particulate matter.

For that purpose, primary and secondary combustion chambers are provided with a passageway or passageways between them with the problem of ensuring substantially complete combustion met by such expedients as the introduction of secondary air into upper chambers, preheating the primary air, forced draft on the primary air intake, forced draft on the exiting gases and the use of a baffle or baffles in the combustion zones.

THE PRESENT INVENTION

The general objective of the present invention is to provide a stove of the two chamber type of a construction that provides a zone enabling excellent secondary combustion to be attained and maintained which is realized with a natural vertical draft.

In accordance with the invention, this general objective is attained with a stove having a lower chamber and an upper chamber with a junction defining portions of both chambers and having a port that is substantially horizontal with respect to the chambers. The upper chamber has a flue outlet in its upper end portions, either laterally opening or in the top wall, and the lower chamber, which is dimensioned to accommodate and support a charge of fuel of predetermined maximum dimensions and volume, has a normally closed opening for use in the introduction of fuel and air inlet means so dimensioned and disposed that the natural draft attending the burning of fuel induces an inflow of air adequate to support the complete combustion of the fuel with at least a substantial portion of the induced air entering the combustion zone laterally of the burning fuel in order that its combustion is attended by a multitude of upwardly rising air streams of different types. One type contains unburned volatile hydrocarbons and oxygen poor air and another type consists of oxygen rich air carried upwardly and heated by the hot air stream.

The port is so dimensioned in relation to the flue outlet and spaced therefrom and is so dimensioned and spaced relative to the maximum cross sectional dimensions of the lower chamber in the zone inclusive of the base of fuel charges and so spaced from the base of burning fuel that a secondary combustion zone is established in which the upwardly rising streams are suddenly contracted, thoroughly intermingled and suddenly expanded with simultaneous heat loss minimized thus providing for the establishment and maintenance of a temperature adequate to result in the combustion of pyrolytic products without flames coming in contact with the lower part of the upper chamber immediately after passing through the port because of the nature of the flow. The height of the second chamber is such that heat loss through the upper end portion does not adversely affect the temperature in the secondary combustion zone. Essential to the secondary combustion zone is that requirement that the distance between the base of the fuel charge and the port must be approximately 0.25 to 1.5 times the maximum cross sectional dimension of the lower chamber substantially at the base of the fuel charge.

In order to ensure the maintenance of temperatures in the secondary combustion zone in an adequate range, heat loss is discouraged not only by the above features which ensure the quick passage of the streams through the port but also in the lower part of the upper chamber and desirably in the upper part of the lower chamber as well.

Heat loss through the wall structure of the secondary combustion zone is controlled by so locating the port that flames do not come in contact with the lower part of the upper chamber. While heat exchange may take place outside the stove, it is commonly wanted from the upper end or upper end portion of the upper chamber and this may be done provided that the temperature in the combustion zone is not reduced to an extent preventing the combustion of pyrolytic products. In addition, such heat loss is or may be prevented by the use of dead air spaces or refractory material. Any of such means may be used in combination with another, either as the margins of a port, which may be in the form of a slot that may extend from end-to-end of a stove or such a port that is shorter or one of any other shape spaced from metal wall structure in any horizontal direction.

In order for secondary combustion to be completed in the upper chamber, the cross sectional area and vertical extent thereof must be such that heat exchange from the top and upper portion of its sides does not cause any substantial heat loss in the lower part of the upper chamber which is the upper portion of the secondary combustion zone.

In general, the height of the upper chamber should be such that the combustion gases impinging on the top of the stove are not redirected back onto the wall structure of the secondary combustion zone. Active heat exchangers or water channels that are to be incorporated in the stove must be placed in the upper part of the upper chamber with its height then such that heat exchange does not lower the temperature in the secondary combustion zone.

PRIOR ART STATEMENT

There are several patents concerned with primary and secondary combustion stages in wood burning stoves but there is none of which I am aware that is relevant to the invention as defined by the appended claims.

Of interest for structural and functional comparisons is the pot-bellied stove. Such a stove has a lower, fuel-containing chamber of substantial height, a short upper chamber having a flue outlet, and a port between the two chambers which is very large for the outlet area and at a height relative to the base of the lower chamber that is very substantial in relation to the maximum width thereof. Combustion in the upper chamber, with or without a baffle or baffles therein, would result in flame impingement against the walls thereof with the heat loss therethrough lowering the temperature therein below that necessary for good secondary combustion. Air enters the lower chamber upwardly through the grate and typically the loading door has adjustable means by which secondary air could be admitted to aid in the burning off of the volatiles. The patent to Futral, No. 1,792,487, describes such a stove and its operation.

It will be noted, however, that such a stove is in fact quite dissimilar from the stoves in accordance with the present invention in which temperatures adequate to ignite pyrolysis gases are ensured, as they lack the essential relative dimensions and spacing of the port relative to the flue outlet and the essential spacing of the port from the base of the fire relative to the maximum width of the lower chamber, both features necessary for the establishment of the secondary combustion zone required by the present invention.

BRIER DESCRIPTION OF THE DRAWINGS

The accompanying drawings illustrate preferred embodiments of the invention of which -

FIG. 1 is a perspective and somewhat schematic view of a stove in accordance with one embodiment;

FIG. 1A is a schematic view illustrating the secondary combustion zone of stoves in accordance with the invention;

FIG. 2 is a section, on an increase in scale, taken approximately along the indicated line 2—2 of FIG. 1;

FIG. 3 is a section taken approximately along the indicated line 3—3 of FIG. 2;

FIG. 4 is a view, similar to FIG. 2 illustrating somewhat schematically a stove in accordance with another embodiment of the invention;

FIG. 5 is another view, similar to FIGS. 2 and 4 illustrating yet another embodiment of the invention;

FIG. 6 is a section taken approximately along the indicated line 6—6 of FIG. 5;

FIG. 7 is a view, similar to FIGS. 2, 4, and 5, illustrating an embodiment of the invention in which the stove is circular in cross section;

THE PREFERRED EMBODIMENTS OF THE INVENTION

Figure 8:
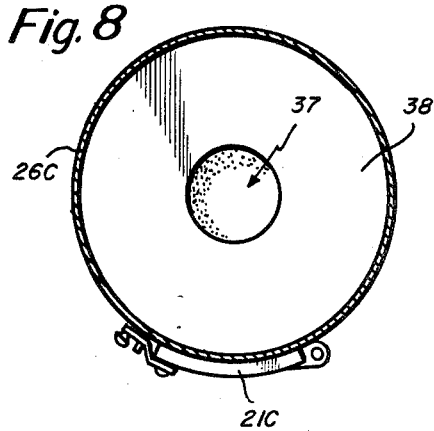
FIG. 8 is a section taken approximately along the indicated line 8—8 of FIG. 7.

The stove illustrated by FIGS. 1–3 is rectangular and preferably oblong in cross section and has an upper chamber 15, a lower chamber 16, and a junction, generally indicated at 17, which defines portions of both chambers and has a port 18 that is substantially horizontal with respect to the chambers and effects communication between them and is shown as a slot extending from the front end of the stove to the back end thereof.

The upper chamber 15 has a flue outlet 19. The lower chamber 16 is shown as having a base 20 of refractory material, a door 21 in its front wall for the introduction of fuel and air inlet means shown as ports 22 in its side walls and located laterally of the base of the fuel.

Figure 12:
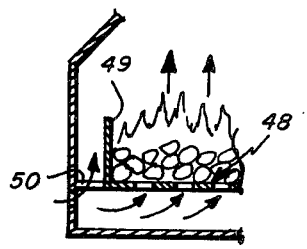
FIG. 12 is a fragmentary view illustrating the incorporation of a grate in a stove in accordance with the invention.

The operation of the stove illustrated by FIGS. 1–3 and by other embodiments of the invention yet to be described require reference to FIG. 1A and also to FIG. 12.

With a fire burning, the natural draft induces a flow of air into the lower chamber that is adequate to ensure the complete combustion of the maximum fuel charge which the lower chamber is dimensioned to accommodate and results in a multitude of upwardly flowing air streams with one type hot and oxygen poor and containing unburned volatile hydrocarbons and another type consisting of oxygen rich air. As previously noted, the air is induced laterally of the burning fuel and when there is a grate in the lower chamber, air flows upwardly therethrough but there is always a substantial portion of the induced air entering laterally of the fire to result in the formation of the two types of air streams, see FIGS. 2 and 12, with the oxygen rich air streams appropriately heated.

Particular reference is made to FIG. 1A which illustrates what occurs with a stove having the two above referred to structural characteristics essential for all embodiments of the invention. The plane L represents the interface between the primary combustion zone which includes the air inlet system and the combustion zone, generally indicated at S where the upwardly rising air stream, oxygen rich streams heated and carried upwardly by hot oxygen poor streams are suddenly contracted and suddenly expanded as they enter and exit from the port P and become thoroughly intermingled as a consequence and with simultaneous heat loss minimized. The plane U represents the interface between the secondary combustion zone S and the portion of the upper chamber where heat exchange may occur if it does not result in a temperature drop in the upper portion of the combustion zone to an extent that would define the burning of pyrolytic gases. Such heat exchange, with a properly dimensioned upper chamber, may simply be through the top and upper portions of the side wall structure or the upper chamber of a heat exchange system employing water or air channels and incorporated therein.

The combustion zone has been described and the relationship between the area of the port and the maximum lateral dimensions of the lower chamber in the zone of the base of the fuel charge characterized as having air inlet means by which at least a substantial portion of the air induced by natural draft enters the combustion zone laterally of and relatively near the base of the flame of the burning fuel charge. In practice, and by way of example and not of limitation, a satisfactory port area is between 0.25 and 2.5 times the cross sectional area of the flue outlet area and is not more than 35% or less than 5% of the area of the fuel charge base and preferably the height of the port is in the approximate range of 0.40 to 1.00 of the maximum cross sectional dimension of the lower chamber substantially at the base of the fuel charge.

The height of the upper chamber relative to the lower chamber is not critical provided that other than the requirement there be enough space therein above the upper portion of the secondary combustion zone to ensure substantially complete combustion with such little heat loss in that zone that appropriate temperatures for complete combustion are attained and maintained. With that limitation in mind, the height of the upper chamber may be somewhat more or somewhat less than that of the lower chamber and will depend in part on whether heat exchange means are to be incorporated therein and such may be included without increasing the overall height of the stove to an objectionable extent.

The distance between the base of the fuel charge and the port is critical as it affects the degree of sudden contraction of the rising streams, the time of their transit to the port and the amount of oxygen rich air that will be available in the upper portion of the combustion zone and the degree to which the oxygen rich air is heated.

As previously stated the ports are so located and dimensioned in the stoves that the rising streams pass quickly therethrough with heat loss minimized through the metal wall structure of the stoves and the construction of the stoves is such that the flames do not contact their side walls of their upper chambers to any substantial extent at least in the lower portions thereof and in any event not to an extent that would reduce the temperature therein to an extent defeating substantially complete combustion. It should be noted that in practice, a considerable number of oxygen rich streams remain unmixed with other streams as they pass through the ports minimizing contact of flames with port margins.

Holding heat loss to a minimum in the secondary combustion zone is attained in FIGS. 1-3 with the junction 17 formed by upwardly inclined walls 24 which establish the upper end of the lower chamber 16 to the inner edges of which are joined the inner edges of upwardly and outwardly inclined walls 25 which establish the bottom of the upper chamber 15. The walls 24 and 25 define with the stove side walls 26 a dead air space 27. In practice, the walls 25 may be less sharply inclined than the walls 24 in order to increase the space between them and the flame and in practice the junction is or may be a replaceable unit in all embodiments of the invention and there are or may be air gaps between the junctions and the surrounding wall structures.

Figure 9:
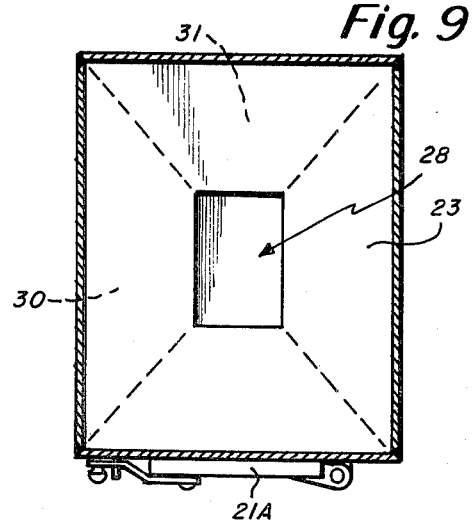
FIG. 9 is a section taken approximately along the indicated line 9—9 of FIG. 4.

The embodiments of the stove illustrated by FIGS. 4 and 9 is or may be generally similar to that just described except for its port 28 and accordingly only that feature will be detailed but with the corresponding parts identified by the same reference numerals distinguished by the suffix addition "A".

The port 28 is rectangular and centrally of a plate 23 which is the bottom of the upper combustion chamber 15A to the margins of which are secured the appropriate ones of the upwardly and inwardly inclined wall sections 30 and 31, the proximate edges of which are welded together and which with the plate 29 and the wall structure of the stove provide a dead air space 32 completely surrounding the port 28.

The stove illustrated by FIGS. 5 and 6 is sufficiently similar, except for its port 33, to the previously described stoves to enable corresponding parts to be identified by the same reference numerals distinguished, however, by the suffix addition "B".

The port 33 is a rectangular recess in one side edge of a plate 34 common to the combustion chambers 15B and 16B and partly closed by a refractory shield 35 held against the proximate side of the stove by a bracket 36.

The stove illustrated by FIGS. 7 and 8 differs from those previously described in that it is circular in cross section and in that its port 37 is shown as circular and in a plate 38 common to the two chambers which and other corresponding parts of the stove are identified by previously employed reference numerals distinguished by the suffix addition "C". The port 37 may, of course, be of other shapes.

In any embodiment of the invention, the port between the chambers may be bordered wholly or in part by refractory material to provide at least a substantial port of the bottom of the upper chamber or substantial parts of both the upper and lower combustion chambers.

Figure 10:
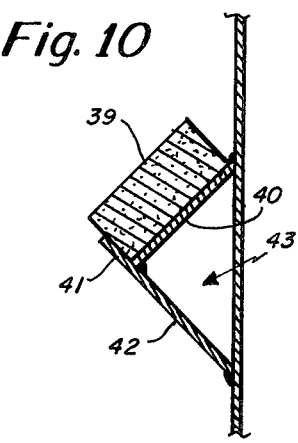
FIG. 10 is a fragmentary view illustrating the use of refractory material marginally of a port on the upper surface of the junction.

As illustrated by FIG. 10, junction between upper and lower chambers may be formed with one or all margins of the port refractory material supported by a downwardly and inwardly inclined wall 40 and by a ledge 41 established by the inner end of an upwardly and inwardly inclined wall 42 which extends beyond the inner edge of the wall 40 to which it is connected. Such a construction, together with the dead air space 43 established by the walls 40 and 42 and the wall structure of a stove provides an effective barrier against any material heat loss in the zone of the port the junction establishes.

Figure 11:
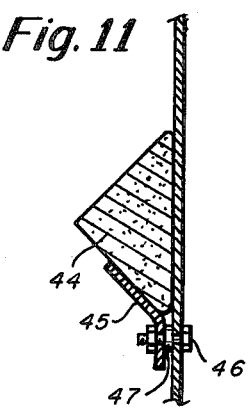
FIG. 11 is a like view in which the junction consists of refractory material which establishes the port.

The junction between the chambers shown in FIG. 11 utilizes refractory brick 44 as one or more of its port-forming margins that is triangular in cross section and held by a bracket 45 which is anchored to the wall structure of the stove by bolts 46 each provided with a washer 47 so spacing the brackets 45 from the wall structure of the stove as to provide a narrow gap further minimizing heat loss through the wall structure of a stove.

Frequent reference has been made to the distance between the base of a fuel charge and the port between the chambers of a stove and to the requirement that at least part of the inlet air must enter the combustion zone laterally of and sufficiently close to the base of the flame to ensure the appropriate heating of the oxygen rich air streams. While the previously described embodiments of the invention have shown the air inlet means simply as ports, they may include conduits or other structures of various types with which the ports are in communication and by which the induced air is appropriately directed and enabling the ports to be located above or below the base of the fuel charge. In the previously described embodiments of the invention, it is assumed that fuel charges rest on a refractory base. Grates may of course be used to support the fuel charges and are necessary when coal is to be burned. Such a grate is shown at 48 in FIG. 12 and the bottom of the fuel charge supported thereby is the base. It will be noted that the margins 49 of the grate provide air inlet means dividing the induced air streams into those passing upwardly through the grate and those providing the upwardly flowing, oxygen rich air streams passing marginally thereof through openings 50.

While the operation of stoves in accordance with the invention has been set forth, it should be noted that temperatures in the combustion zone typically reach 1200° F. within four to six minutes after start up and have a normal operating temperature range during the pyrolysis phase of combustion of from 1300° F. to 1600° F. Higher temperatures have been noted, however. In practice such temperatures have been attained with air inlets such as to provide a burn rate such as to essentially consume a normal wood charge within a time period of approximately one to two hours.

I claim:

1. A stove or furnace unit for use with solid hydrocarbon fuels, said unit including a metal shell and a junction dividing said shell into upper and lower chambers and having a central, substantially horizontal port effecting communication between said chambers, said junction including upper and lower portions defining the proximate ends of the upper and lower chambers, respectively, at least the lower portion of said junction metal and connected to said shell a substantial distance from the outer edge of the upper portion, said upper chamber having a flue outlet, said lower chamber shaped and dimensioned to establish a primary combustion chamber to accommodate and support a charge of fuel of predetermined maximum dimensions and volume and having a normally closed opening for use in the introduction of the fuel, said lower chamber also having air inlet means so dimensioned and disposed that the natural draft attending the burning of the charge induces an inflow volume of air adequate to support the complete combustion of the charge including pyrolytic products with at least a substantial portion of the induced air entering the combustion zone laterally of the fuel charge in a manner such that combustion of the fuel is attended by a multitude of upwardly flowing streams of different types, one type containing unburned volatile hydrocarbons and oxygen poor air and another consisting of oxygen rich air, the vertical distance between the base of the supported fuel charge and the port so approximately 0.25 to 1.5 times the maximum lateral dimension of said lower chamber in the zone of said fuel charge so that during the normal operation of the unit, said port is in the flame front, a substantial portion of the oxygen rich air stream remain independent of the other streams but is heated and carried upwardly thereby, said port of an area approximately 0.05 to 0.35 times the cross sectional area of the lower chamber in the zone of said fuel charge so that the rising streams are suddenly contracted as they approach and enter the port and are suddenly expanded as they exit therefrom and during such contraction and expansion said streams become turbulently and intimately mixed but with a substantial volume of heated oxygen rich air entering the upper chamber with combustion of the volatile hydrocarbons occurring in a secondary combustion zone including the upper portion of the lower chamber and the lower portion of the upper chamber, said junction constituting a barrier against heat loss through the metal shell that would interfere with the combustion of volatile hydrocarbons in the lower portion of the upper chamber, said upper chamber of a cross sectional area and height such that combustion is complete therein without any substantial impingement of flame on wall metal structure of said secondary combustion zone at least in the lower portion of said upper chamber and the upper portion of the upper chamber constituting a heat exchanging zone.

2. The stove of claim 1 in which a substantial number of oxygen rich air streams reach and pass through the port between the margins thereof and the flame.

3. The stove of claim 1 in which the means operable to minimize heat loss comprises material spacing the port from the wall structure of the stove to an extent such that combustion occurs without any substantial impingement of burning gases against the wall structure of said upper chamber at least in the combustion zone.

4. The stove of claim 3 in which the port is centrally of the junction.

5. The stove of claim 3 in which the port is a narrow slot dividing the junction.

6. The stove of claim 3 in which the junction includes a transverse, horizontal partition having a marginal recess, and fire brick supported by the wall structure and extending into both chambers, the port defined by said recess and said fire brick.

7. The stove of claim 3 in which the junction includes a transverse horizontal partition with the port central thereof, a lower portion upwardly and inwardly inclined and surrounding said port and connected to the partition adjacent thereto, and stove wall structure closing the space between the outer margins of the partition and lower portion to provide a dead air space surrounding the port.

8. The stove of claim 1 in which the junction includes fire brick disposed between the port and any portion of the wall structure of the upper chamber against the metal surfaces of which the burning gases would otherwise impinge, supporting structure for the fire brick, and means connecting the supporting structure to the wall structure of the stove.

9. The stove of claim 1 in which the junction between the chambers includes upper and lower portions, the lower portion upwardly and inwardly inclined, and the inner margins of both portions interconnected.

10. The stove of claim 9 in which stove wall structure closes the space between the outer margins of said upper and lower portions to provide a dead air space marginally of the port.

11. The stove of claim 10 in which the upper portion is downwardly and inwardly inclined.

12. The stove of claim 1 in which the junction includes fire brick the inner margins of which establish the port and locate the port centrally of the junction, supporting structure for the fire brick, and means connecting the supporting structure to the wall structure of the stove.

13. The stove of claim 12 in which the means connecting the supporting structure to the wall structure are bolts and means to space the supporting structure from the wall structure to provide an air gap therebetween.

14. The stove of claim 13 in which the cross sectional shape of the fire brick is such as to provide an upwardly and inwardly inclined lower surface and an apex.

15. The stove of claim 14 in which the cross sectional shape of the fire brick is such as to provide an upwardly and outwardly inclined upper surface.

16. The stove of claim 11 in which the inner edge of the lower portion extends beyond the inner edge of its upper portion to provide a ledge, and fire brick is supported by said upper portion and seated against said ledge.

17. The stove of claim 1 in which the junction between the chambers includes at least a lower portion, and fire brick held by said portion and shaped and dimensioned to provide a port defining portion extending inwardly therefrom, at least the lower surface of said portion upwardly and inwardly inclined.

18. The stove of claim 1 in which there is an air gap between the junction and wall structure of the stove.

* * * * *